Nov. 24, 1964
J. T. McNANEY
3,158,430
TRANSDUCING APPARATUS
Filed July 5, 1960
2 Sheets-Sheet 1
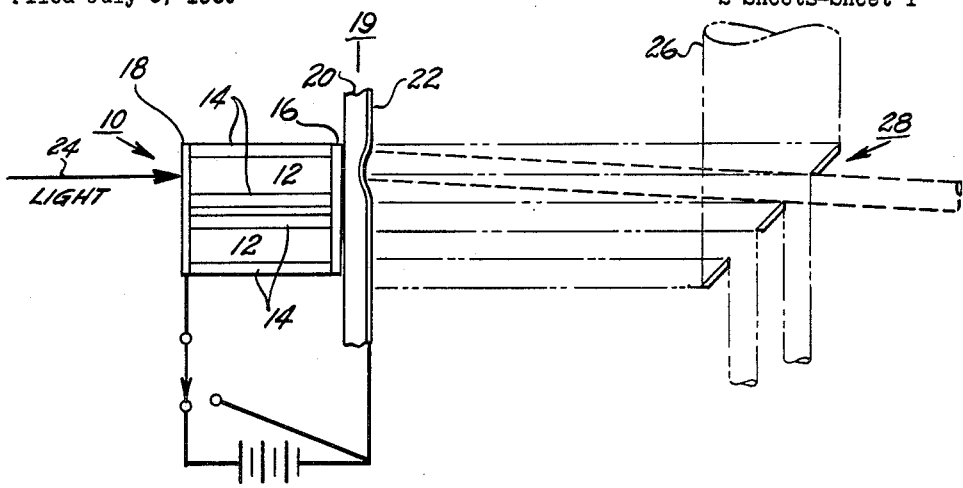
*fig.1*
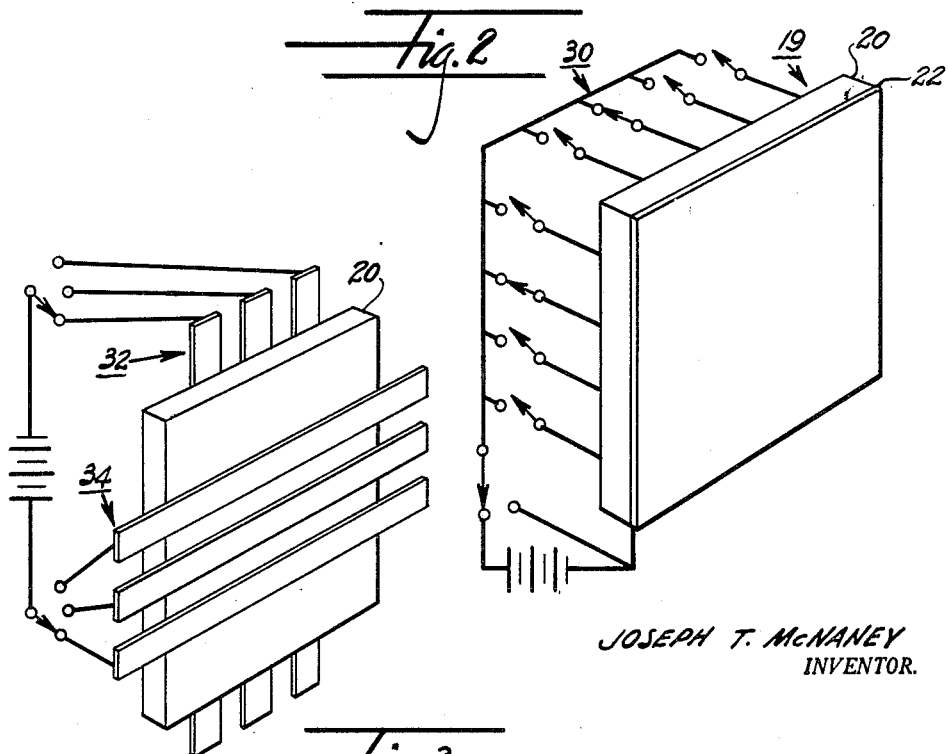
*fig.2*
*fig.3*
JOSEPH T. McNANEY
INVENTOR.

Nov. 24, 1964  J. T. McNANEY  3,158,430
TRANSDUCING APPARATUS
Filed July 5, 1960  2 Sheets-Sheet 2

JOSEPH T. McNANEY
INVENTOR.

ed Nov. 24, 1964

3,158,430
TRANSDUCING APPARATUS
Joseph T. McNaney, La Mesa, Calif., assignor to General Dynamics Corporation, Rochester, N.Y., a corporation of Delaware
Filed July 5, 1960, Ser. No. 40,793
12 Claims. (Cl. 346—77)

This invention relates to transducing apparatus, and more particularly to apparatus that takes informtion in the form of light or electrical signals, and stores it—from which it may be converted into a visible display.

A recently introduced method of storing information uses an electron beam to deposit electrons in an electrical charge pattern on the surface of a deformable plastic tape. When the tape is softened by suitable heating, its cross section deforms as a result of the electrostatic field produced by the charge pattern. The tape is then permitted to harden; in this way "freezing" the deformations, which are then made visibile by use of an optical system. The "frozen" deformations thus form a stored image that corresponds to the stored information.

Since the above system uses an electron beam, it is limited to use in an evacuated envelope. There are times when this limitation is undesirable; and other times when a permanent deformation is unnecessary.

It is therefore the principal object of my invention to provide apparatus and a method for using a deformable medium to record data, without being limited to use in an evacuated envelope.

The attainment of this object and others will be realized from the following specification taken in conjunction with the drawings, of which:

FIGURE 1 illustrates my basic inventive concept;

FIGURES 2 to 5 show various embodiments thereof; and

Figure 6:
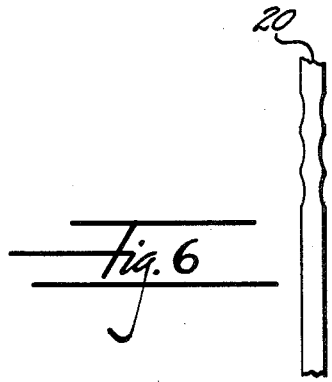

FIGURE 6 describes the use of a different material.

Broadly speaking, my invention contemplates various structures for producing a charge pattern on a deformable medium.

The embodiment shown in FIGURE 1 is one wherein input data that is in the form of light is stored on a deformable tape. To achieve this result I use a structure 10 that comprises optical fibers 12, only two of which are shown. As is well known, optical fibers are small-diameter rods of material having good light-conducting characteristics. Light introduced into one end of these fibers is transmitted to the other end by multiple internal reflections. In the structure of FIGURE 1 each optical fiber is inherently electrically conductive, or is surrounded by a sleeve 14 that comprises conductive material, or photoconductive material that becomes conductive when illuminated. A coating 16 of photoconductive material is positioned on the end of structure 10; and a film 18 of transparent electrically conductive material is positioned on the other end.

Positioned contiguously with photoconductive coating 16 is a storage element 19 comprising a sheet 20 of deformable material that has on its outer surface a film 22 of electrically conductive material that has a reflective outer surface.

In operation my invention operates as follows. Incoming light beams 24 traverse transparent electrically conductive film 18, and enter selected optical fibers 12 to be transmitted therethrough to impinge upon selected areas of photoconductive material 16. Due to the fact that the optical fiber is conductive or has a now conductive coating surrounding it, the potential that is applied to the electrically conductive layer 18 now appears at the illuminated areas of the photoconductive material 16.

There is therefore an electrostatic field between the illuminated areas of photoconductive material 16 and the conductive film 22 on the deformable medium. The stresses set up by the electrostatic field cause material 20 to be deformed opposite the illuminated optical fibers, and since the reflective coating 22 is contiguous with deformable material 20, it is also deformed. A single deformation is shown, for explanatory purposes, as a dimple or crater.

The pattern of deformations may be made visible by any of several optical systems. In the one shown, light beam 26 from a secondary source is directed at a slotted mirror 28. The mirror reflects some of the light to surface 22, which, in its normal undeformed state, reflects the light back to the solid portions of the slotted mirror— as shown by the solid lines. When, however, materials 20 and 22 are deformed, the light is reflected as shown by the dotted lines to traverse the slots of the mirror. Suitable utilization devices then produce usable optical or electrical output signals.

The deformation may be erased by throwing the switch to its other position, which removes the electrostatic field. Alternatively, the deformations may be "frozen" for study elsewhere.

FIGURE 2 shows another embodiment of my invention wherein the incoming information is no longer in the form of light, but is in the form of electrical signals. Structure 19 again comprises a sheet 20 of deformable material and a film 22 of conductive reflective material. The incoming data is applied to a series of pins or wires 30 that are selectively energized by means of switches or a commutator. The operation of the embodiment shown in FIGURE 2 is the same as previously described, namely the potential applied to the various pins or wires produces electrostatic fields that deform mediums 20 and 22, whose deformations are detected as previously described.

FIGURE 3 shows a modification of my invention wherein a series of crossed grids is used to produce deformations. A first set 32 of grids is energized by a series of swiches or a commutator; while a second set 34 of perpendicularly positioned grids is similarly energized. At the intersection of the energized grids the electrostatic field deforms material 20 as previously explained. A reflective surface (which may be positioned on the deformable material, or may comprise one set of grids) re-directs light as previously explained.

Figure 4:
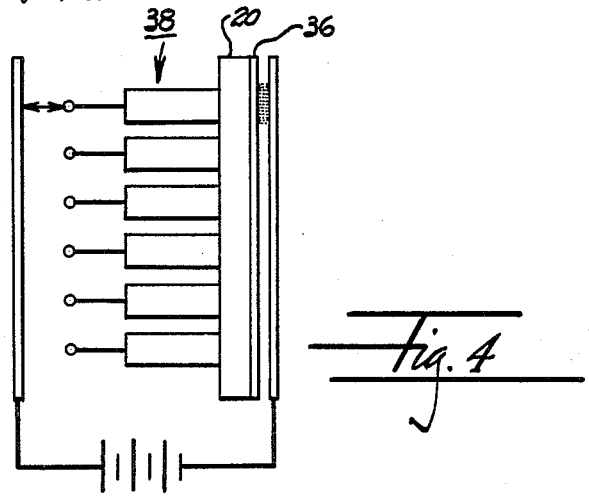

The embodiment of FIGURE 4 uses a different approach. Here deformable material 20 is coated with a reflective, non-conductive material 36—such as a plastic. An array 38 of pins or conductors is selectively energized as previously explained. When one of these pins is energized, it produces a corona discharge that provides a charge pattern on deformable material 20. The deformable material is therefore deformed as previously explained, and its deformation redirects the light rays.

Figure 5:
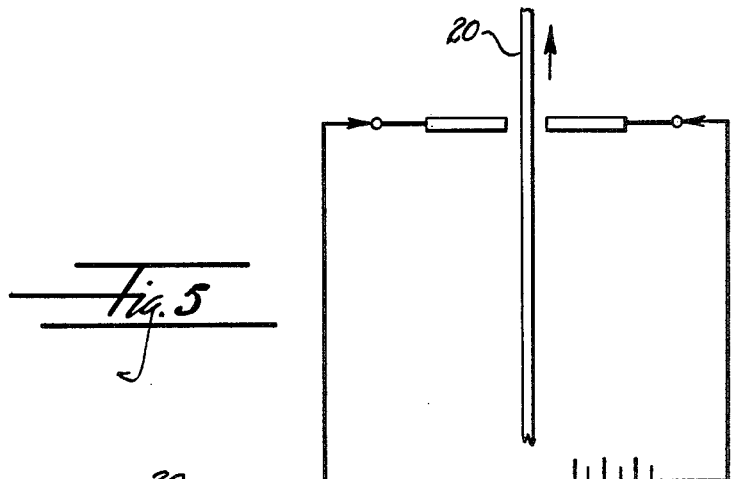

In FIGURE 5 the deformable material 20 is a moving strip, which passes between opposing sets of aligned pins. By suitably energizing selected switches, charges are produced on both surfaces of the material, which is therefore deformed as previously explained. The deformations may be viewed by suitable apparatus.

In FIGURE 6 material 20 is transparent, and its deformation produces a plurality of minute lenses that refract light—rather than reflecting it as was done by previous embodiments.

The particular embodiment of the invention illustrated and described herein is ilustrative only and the invention includes such other modifications and equivalents as may readily appear to those skilled in the art, within the scope of the appended claims.

I claim:

1. The combination comprising: a plurality of bundled conductive light guides, the ends of said guides forming two surfaces; a transparent conductive coating positioned on one said surface whereby a potential may be applied thereto; said coating normally having a planar outer surface adapted to reflect light impinging thereupon; a film of photoconductive material positioned on said other surface whereby when light traverses selected said light guides said potential is applied to the areas of said photoconductive material adjacent to the ends of said selected light guides; a material, that is deformable by an electrostatic field, positioned adjacent said photoconductive material; a layer of conductive material positioned contiguously with the other side of said deformable material; and means for applying a potential between said conductive coating and said conductive material to produce irregularities in said normally planar outer surface of said coating in regions adjacent to the ends of said selected light guides.

2. The combination comprising: a sheet of material that is deformable by an electrostatic field and having a normally planar light reflecing surface in the absence of said electrostatic field; a first set of parallel grids positioned adjacent one surface of said sheet; a second set of parallel grids positioned adjacent the other surface of said sheet, said sets of grids being angled with respect to each other; means for applying a potential to selected grids of said first set; and means for applying a potential to selected grids of said second set for providing irregularities in the normally planar reflecting surface of said sheet of material owing to the electrostatic field established by said selected grids.

3. The combination of claim 2 wherein one of said sets of grids is reflective.

4. The combination of claim 2 wherein the surface of said material adjacent one set of grids is reflective.

5. The combination comprising: a sheet of material that is deformable by compression when an electrostatic field is placed across opposing surfaces thereof, a first conductive element positioned adjacent one surface of said sheet; a second conductive element positioned adjacent the other surface of said sheet; said second conductive element having a planar outer surface for reflecting light incident thereupon during the absence of said electrostatic field; and means for applying a potential to said elements sufficient to compress said deformable sheet by the electrostatic field established between said elements to produce concavities in said normally planar outer surface of said second conductive element.

6. The combination comprising: a movable strip of material that is deformable by an electrostatic field; a first set of conductive elements positioned with their ends directed toward one surface of said strip; a second set of conductive elements positioned with their ends directed toward the other surface of said strip; said strip normally having opposed planar surfaces in the absence of said electostatic field; and electrostatic field producing means for applying a potential between selected said elements for producing concavities in those portions of said movable strip exposed to said potential.

7. The combination comprising: a material that is deformable by an electrostatic field; a conductive coating positioned contiguously with one side of said material; said conductive coating having an outer light reflecting surface which is normally planar in the absence of said electrostatic field; means, comprising electrical conductors, for applying a potential to selected areas of the other side of said material; and means for applying a potential to said conductive coating to produce irregularities in the normally panar surface of said conductive coating.

8. The combination of claim 7 wherein said electrical conductors are positioned with their ends directed at said deformable material.

9. The combination of claim 7 wherein said electrical conductors are positioned parallel to said deformable material.

10. The combination comprising: a material that is deformable by compression when an electrostatic field is placed across opposing surfaces thereof; a conductive coating positioned contiguously with one of said opposing surfaces of said material whereby said coating may coact in establishing an electrostatic field across said material; said coaing having a planar outer surface for reflecting light incident thereupon during the absence of said electrostatic field; and means for applying a potential to selected areas of the other of said opposing surposes of said material for producing irregularities in said normally planar outer surface of said reflecting coating.

11. The combination of claim 10 wherein said last means comprises a plurality of conductive light guides.

12. The combination comprising: a material that is deformable by compression when an electric field is placed across opposing surfaces thereof, said material having planar reflective surfaces in the absence of said electric field; and means located adjacent both of said opposing surfaces for applying an electric field across said deformable material which is sufficient to form local concavities in the surfaces of said material without causing a disruptive discharge therethrough; and means for radiating said reflective surfaces with light.

References Cited in the file of this patent

UNITED STATES PATENTS

| | | |
|---|---|---|
| 853,755 | Belin | May 14, 1907 |
| 1,891,780 | Rutherford | Dec. 20, 1932 |
| 2,565,514 | Pajes | Aug. 28, 1951 |
| 2,610,102 | Gitzendanner et al. | Sept. 9, 1952 |
| 2,624,652 | Carlson | Jan. 6, 1953 |
| 2,925,310 | Perkins | Feb. 16, 1960 |
| 2,928,075 | Anderson | Mar. 8, 1960 |
| 2,963,335 | Hall et al. | Dec. 6, 1960 |

FOREIGN PATENTS

| | | |
|---|---|---|
| 342,219 | Great Britain | Jan. 29, 1931 |

OTHER REFERENCES

"Electronic Industries" February 1960, pages 76, 79.
Paehr: Ser. No. 354,771 (A.P.C.) May 18, 1943.